April 3, 1934.  L. C. GOAD  1,953,170
MACHINE FOR SPLITTING GRID CASTINGS
Filed Dec. 17, 1930  13 Sheets-Sheet 1

April 3, 1934.   L. C. GOAD   1,953,170
MACHINE FOR SPLITTING GRID CASTINGS
Filed Dec. 17, 1930   13 Sheets-Sheet 3

April 3, 1934.  L. C. GOAD  1,953,170
MACHINE FOR SPLITTING GRID CASTINGS
Filed Dec. 17, 1930   13 Sheets-Sheet 4

April 3, 1934.  L. C. GOAD  1,953,170
MACHINE FOR SPLITTING GRID CASTINGS
Filed Dec. 17, 1930   13 Sheets-Sheet 9

April 3, 1934.   L. C. GOAD   1,953,170
MACHINE FOR SPLITTING GRID CASTINGS
Filed Dec. 17, 1930   13 Sheets-Sheet 13

Inventor
Louis C. Goad
By Spencer Hardman & Fehr
his Attorneys

Patented Apr. 3, 1934

1,953,170

UNITED STATES PATENT OFFICE 1,953,170

MACHINE FOR SPLITTING GRID CASTINGS

Louis C. Goad, Muncie, Ind., assignor to Delco-Remy Corporation, Anderson, Ind., a corporation of Delaware Application December 17, 1930, Serial No. 502,982

21 Claims. (Cl. 29—2)

This invention relates to the manufacture of storage batteries and particularly the size of storage batteries used on automotive vehicles. In the manufacture of automobile storage batteries the practice has been to cast the storage battery grids in pairs in order to facilitate handling through the pasting machine in which the active material is forced into the recesses provided by the grids and also to facilitate handling through the drying apparatus. These grids are cast together in Siamese fashion, that is, they are joined by a thin web of metal which can easily be broken out so as to separate the battery grids after the pasting and drying operations.

It is one of the objects of the present invention to provide apparatus for automatically separating or breaking apart the pairs of storage battery grids. This aim of the invention is carried out by apparatus which provides a magazine for holding pairs of pasted grids, means for feeding the grids one pair at a time to a conveyor which carries the grids through cooperating rollers which operate to break out or push out the membrane of metal which temporarily joins them.

Another object of the invention is to provide means for removing excess paste from the side edges of the grid casting.

A further object of the invention is to provide means for finishing the grid tangs preparatory to assembling the grid with terminal lugs. This aim of the invention is carried out by means which trim off the tangs to the desired dimension and also applies a wire brush or similar device to clean off paste and other substances which would interfere with the operation of burning the grid tang to the lug.

Further objects and advantages of the present invention will be apparent from the following description, reference being had to the accompanying drawings wherein a preferred embodiment of one form of the present invention is clearly shown.

In the drawings:

Figs. 3 and 4 taken together constitute a side elevation of the machine viewed from the opposite side of the machine as shown in Figs. 1 and 2.

Figure 1:
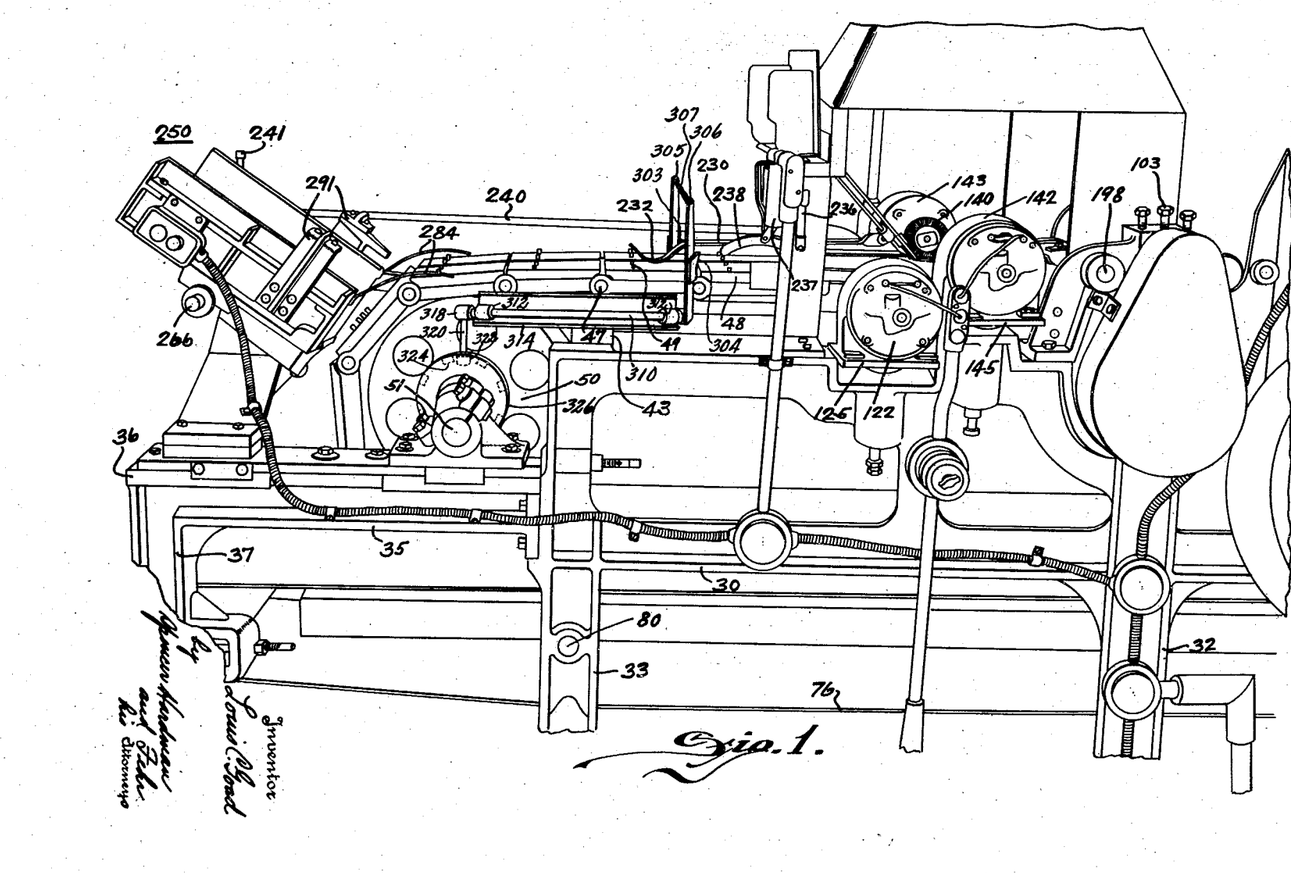
Figs. 1 and 2 are perspective side views showing together one side and portions of the top of the machine.

The apparatus comprises two frames 30 each having legs 31, 32 and 33 by which the machine is supported by a base plate 34. There is secured to the left end of each frame 30 as viewed in Fig. 1 or to the right end as viewed in Fig. 4 a frame 35 providing a platform 36 and having a leg 37 resting on the base plate 34. Extending from the right end of each frame 30, as viewed in Fig. 2, or from the left end as viewed in Fig. 3, is an auxiliary frame 40, the outer end of which is supported by a pipe stand pedestal 41 having a flanged base 42 resting upon the floor.

Figure 10:
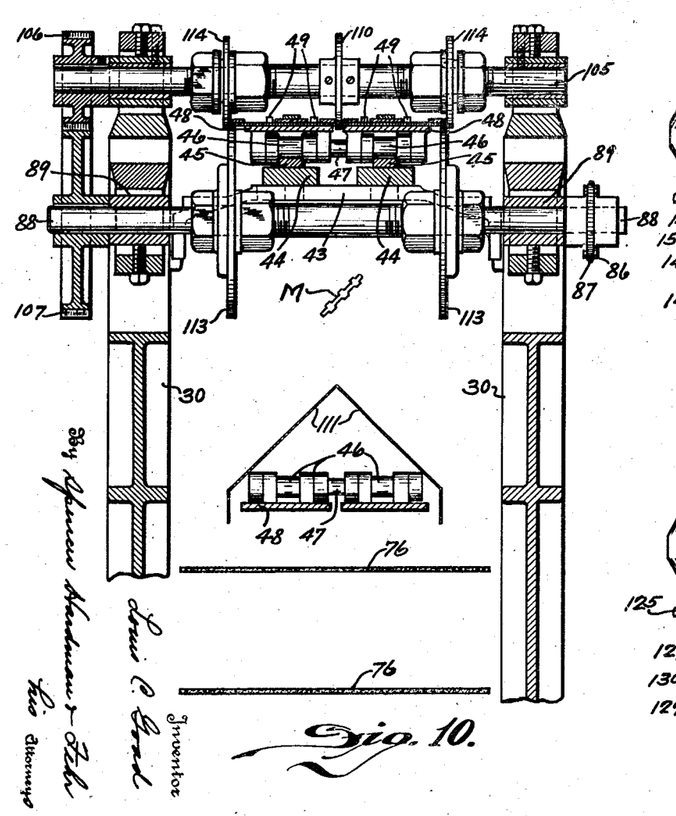
Fig. 10 is a sectional view on the line 10—10 of Fig. 3.

Referring particularly to Fig. 10, it will be seen that the two frames 30 are tied together by tie bars 43 which support longitudinally extending bars 44 each carrying a rail 45. The rails 45 support and guide two chain conveyors 46 which are tied together by the link pins 47 which maintain the links of the conveyors in lateral alignment at all times. Each conveyor link is integral with a grid holder or pad 48 carrying two pins 49 adapted to receive an edge of a storage battery grid. Since the pads 48 travel in pairs and each pad receives one grid, it is apparent that each pair of pads is adapted to receive a pair of grids G1 and G2 cast integrally with a web or metal membrane M joining them as shown more clearly in Figs. 6 and 18. The two conveyor chains 46 pass around two pairs of sprocket wheels. One pair of sprocket wheels 50, 50 is carried by a shaft 51 journalled in bearings 52 supported by the auxiliary frames 35 respectively. The other pair of sprocket wheels 53 is carried by and driven by a shaft 54 mounted in bearings 55 provided by the frames 30 respectively.

Figure 4:
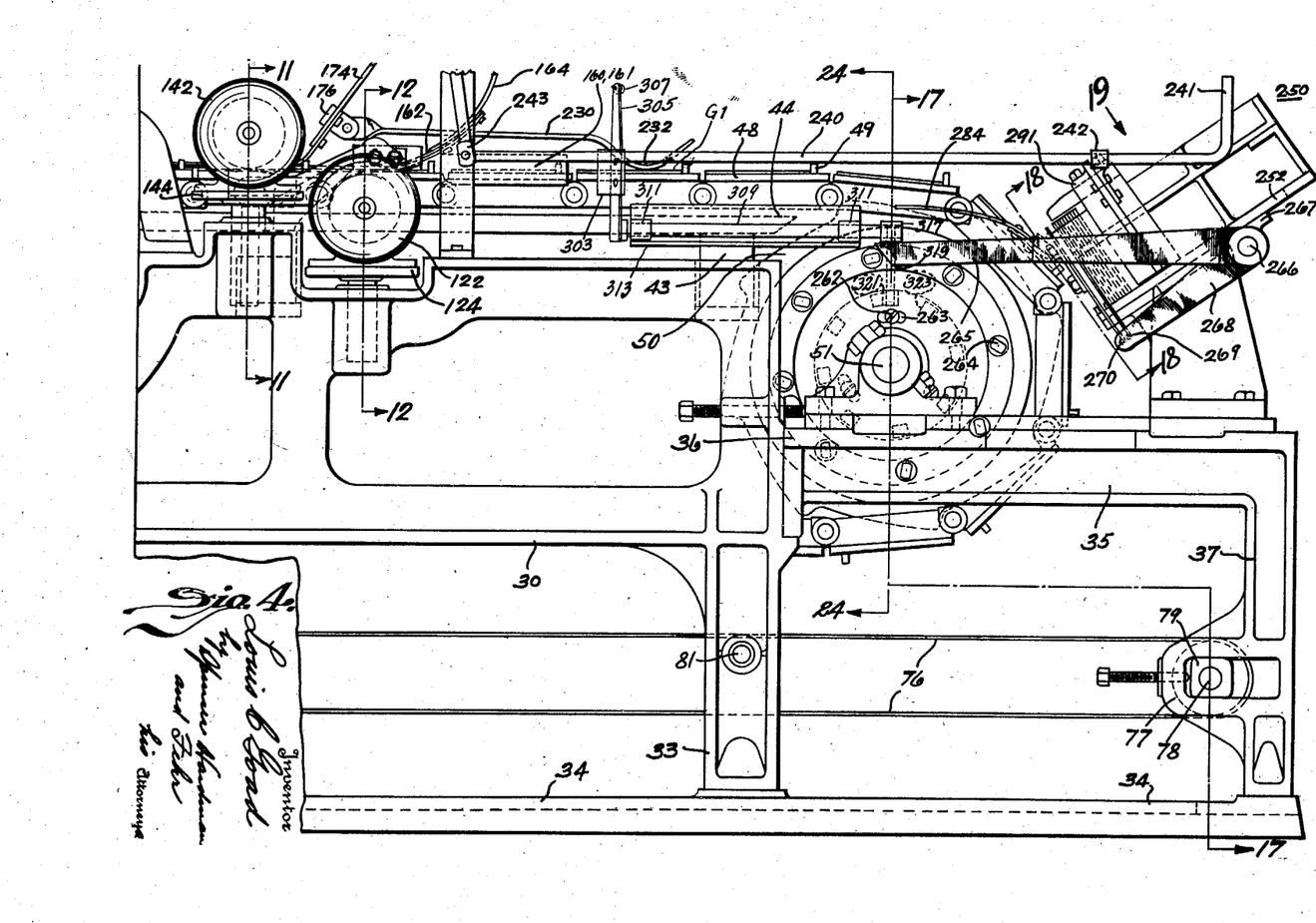
Figure 5:
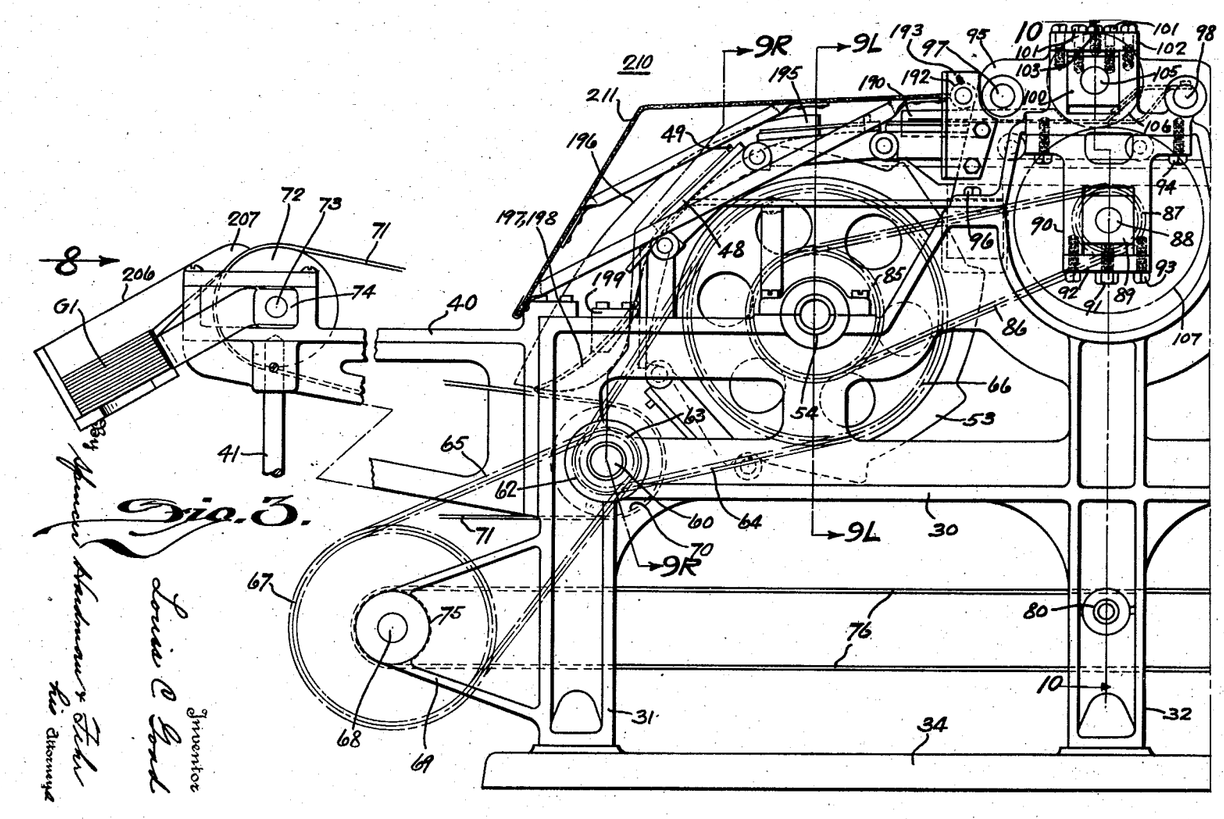
Figs. 5 and 6 constitute a plan view of the machine as shown in Figs. 3 and 4.

The main drive shaft of the machine is designated by numeral 60 in Figs. 3 and 5 and is driven through a suitable coupling 61 by an electric motor (not shown). The shaft 60 is supported in bearings provided by the frames 30 respectively and carries sprocket gears 62 and 63 connected by chains 64 and 65 respectively with sprocket gears 66 and 67 respectively which are drivingly connected with shafts 54 and 68 respectively. The shaft 68 is supported by bearing bracket 69 integral with the frame legs 31 respectively. The shaft 60 carries a conveyor belt roller 70 around which passes a conveyor belt 71 passing also around a roller 72 supported by a shaft 73 journalled in bearings 74 provided by the frames 40 respectively. The shaft 68 carries a conveyor belt roller 75 around which passes a conveyor belt 76 passing also around a roller 77 carried by a shaft 78 journalled in bearings 79 provided by frame legs 37 respectively as shown in Fig. 4. The belt 76 passes over frame tie rods 80 and 81 which respectively join pairs of legs 32 and 33. These tie rods serve to support the upper run of the belt 76.

The shaft 54 carries a sprocket wheel 85 which drives a chain 86 connected with a sprocket wheel 87 mounted on a shaft 88 journalled in bearing blocks 89 which are carried by brackets 90 and are vertically adjustable therein by operating screws 91 threadedly connected with plates 92 attached by screws 93 to the brackets 90. The brackets 90 are attached by screws 94 to brackets 95 respectively. The brackets 95 are respectively attached by screws 96 to the frames 30 and are maintained in spaced relation by tie rods 97 and 98. Each bracket 95 provides a guide for a vertically adjustable bearing block 100 which is vertically adjustable by turning screws 101 which pass through plain holes in a bearing block cap 102 and which are received by tapped holes in the bearing block 100. When the vertical adjustment is made the block 100 may be clamped in adjusted position by tightening a screw 103 received by a tapped hole in the cap 102. The two bearing blocks 100 support a shaft 105 carrying a gear 106 meshing with a gear 107 mounted on and driven by the shaft 88.

The device for progressively punching out the metal membrane M between the pairs of storage battery grids G1 and G2 includes a hard metal wheel 110 mounted on the shaft 105 and which gradually punches the membrane M down between the adjacent side edges of the grid supporting pads of the conveyor. One of these pieces M is shown in Fig. 10. The pieces M will fall upon a guard 111 covering the lower run of the conveyor chains 46 and diverting the pieces M upon the upper run of the belt 76. This belt 76 moves from right toward left as viewed in Figs. 3 and 4 or from left toward right as viewed in Figs. 1 and 2 and conveys the pieces M to a transverse conveyor belt 112 driven by any suitable means (not shown) and so arranged that it will carry the pieces M to a suitable hopper.

Figure 6:
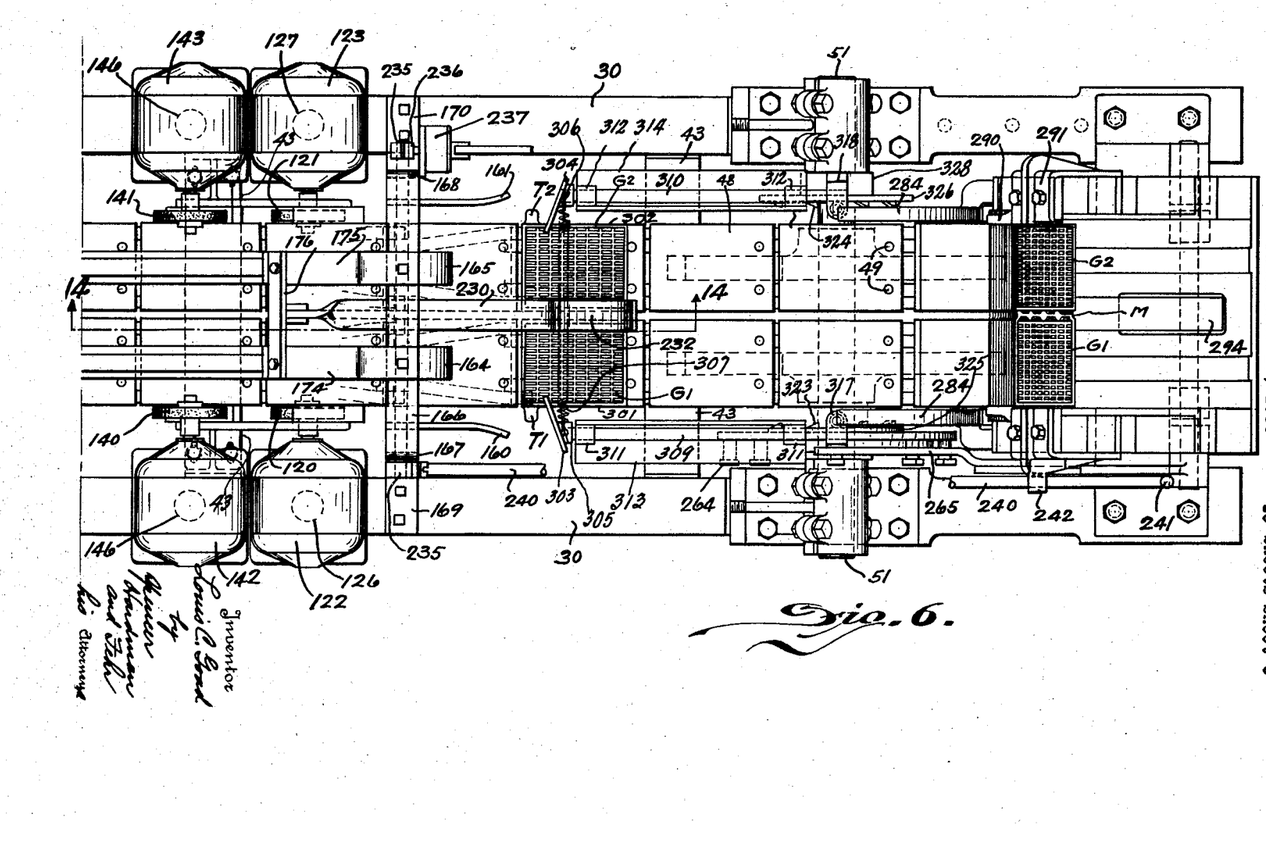
Figure 7:
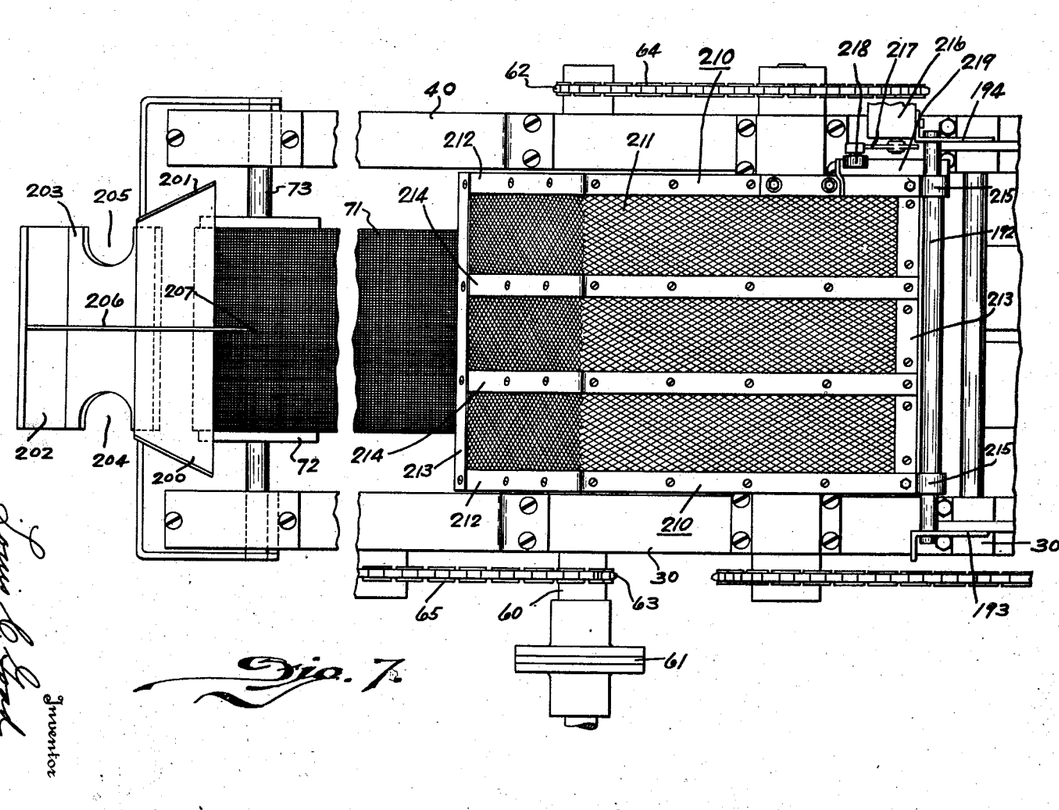
Fig. 7 is a fragmentary plan view of certain parts shown in Fig. 5 with the guard added thereto.
Figure 8:
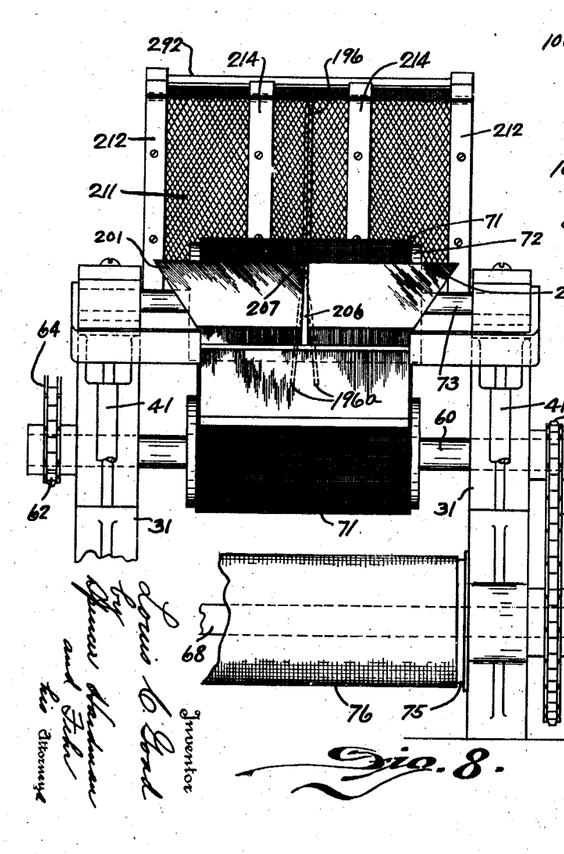
Fig. 8 is a fragmentary end view looking in the direction of the arrow 8 in Fig. 3.
Figure 9:
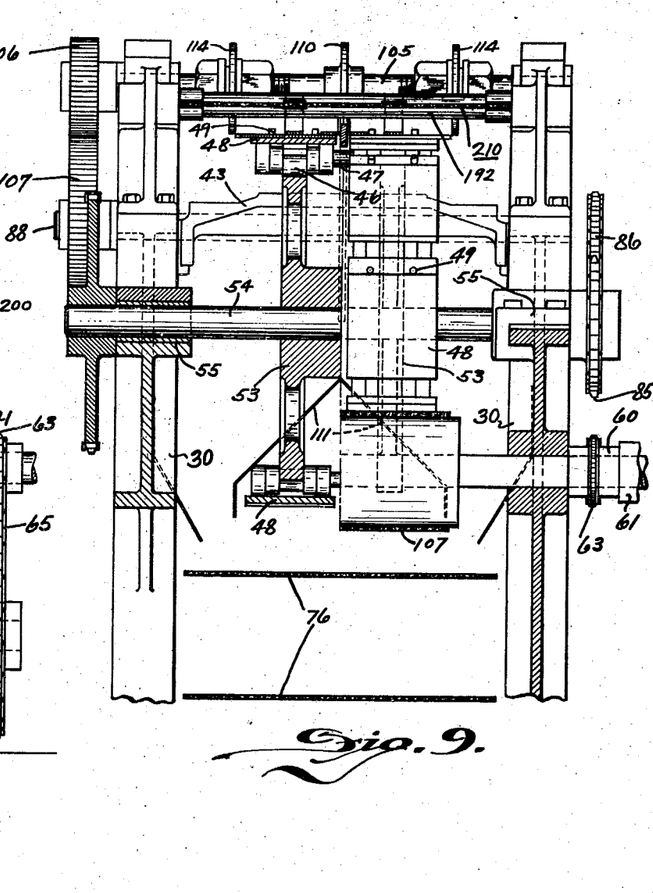
Fig. 9 is a fragmentary sectional view, the right end portion of which is taken approximately on the line 9R—9R of Fig. 3 and the left end portion of which is taken on the line 9L—9L of Fig. 3.
Figures 17, 18, 19, 20, 21:
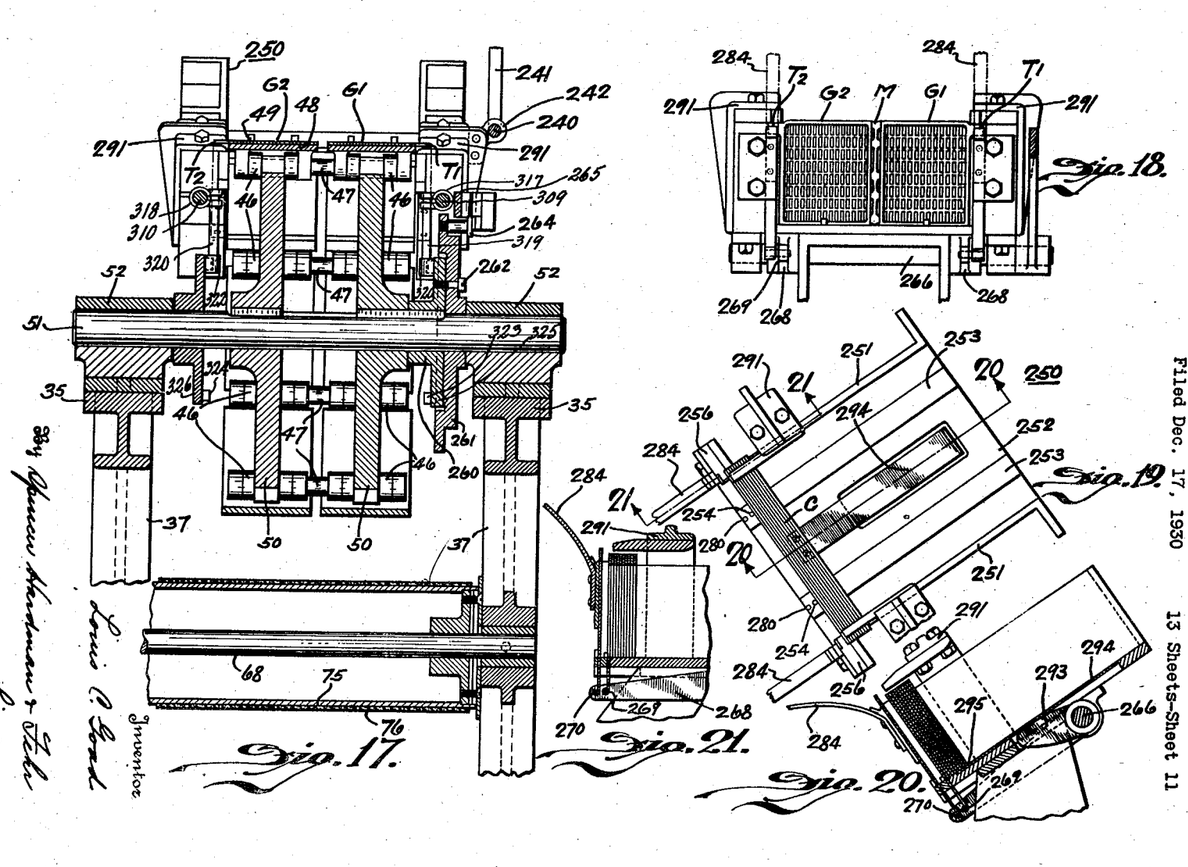
Fig. 17 is a fragmentary sectional view on the line 17—17 of Fig. 4.
Fig. 18 is a fragmentary sectional view on the line 18—18 of Fig. 4.
Fig. 19 is a fragmentary plan view of the magazine viewed in the direction of the arrow 19 in Fig. 4.
Fig. 20 is a sectional view on line 20—20 of Fig. 19.
Fig. 21 is a sectional view on line 21—21 of Fig. 19.

While the grids are being separated by progressively punching out the membrane M the grid tangs T1 and T2 shown in Figs. 5, 6 and 18 are trimmed off by pairs of trimming wheels 113, 114. The two wheels 113 are mounted on the shaft 88 and serve as rotary shear blades for supporting the under sides of the tangs while they are being operated upon by the shear blade wheels 114 mounted on the shaft 105.

Figure 11:
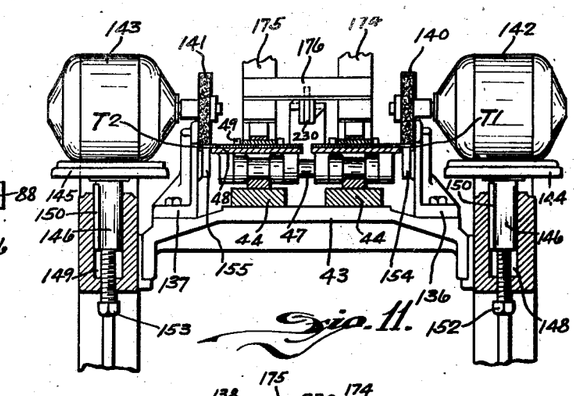
Fig. 11 is a sectional view on the line 11—11 of Fig. 4.
Figure 12:
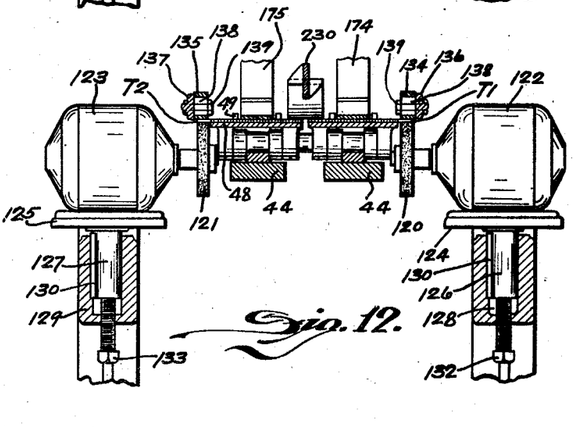
Fig. 12 is a sectional view on the line 12—12 of Fig. 4.

Before the ends of the grid tangs T1 and T2 are trimmed off by the pairs of wheels 113, 114 they are cleaned by rotary brushes having wire bristles. Referring to Fig. 12 the under surfaces of the tangs T1 and T2 are cleaned by brushes 120 and 121 respectively driven by electric motors 122 and 123 respectively mounted on shelves 124 and 125 respectively having shanks 126 and 127 respectively received by tubular bosses 128 and 129 respectively provided by the side frames 30. Each of the shanks 126, 127 is longitudinally splined to its boss by a key 130. Adjusting screws 132 and 133 respectively serve to adjust the height of the motors 122 and 123 respectively and hence the brushes 120 and 121 which are driven by them. While the under surface of the tangs T1 and T2 are being operated upon by the wire brushes, the upper surfaces of these tangs are supported or backed by blocks 134 and 135 respectively adjustably supported by brackets 136 and 137 respectively, which as shown in Fig. 11 are supported by a tie bar 43. Vertical adjustment of the blocks 134 and 135 relative to the brackets 136 and 137 is provided by providing these blocks with vertically elongated slots 138 through which pass the clamping screws 139 which are threadedly attached to the brackets 136 and 137.

The upper surfaces of the tangs T1 and T2 are cleaned preparatory to trimming them off by the same sort of apparatus as employed for cleaning the under side of the tangs. As shown in Fig. 11 the upper sides of the tangs T1 and T2 are engaged by wire bristle brushes 140 and 141 driven respectively by motors 142 and 143 mounted on shelves 144 and 145 having shanks 146 and 147 respectively received by tubular bosses 148 and 149 respectively and longitudinally splined thereto by keys 150. The vertical height of the motors 142 and 143 and hence of the brushes 140 and 141 is varied by turning adjusting screws 152 and 153 respectively. While the upper surfaces of the grid tangs T1 and T2 are being operated upon by the rotary brushes 140 and 141, their lower surfaces are supported by blocks 154 and 155 vertically adjustably supported by the brackets 136 and 137 respectively in the same manner which has been described with reference to the blocks 134 and 135 in Fig. 12.

Referring particularly to Figs. 5 and 6, 13 and 14 there will now be described a number of devices which are used to hold the grids firmly upon the supporting pads 48 of the conveyor while the grids are being operated upon by the various devices which this machine provides. As the grids pass from right toward left as viewed in Fig. 6 they are located automatically centrally with respect to the machine by bars 160 and 161 which engage the tangs T1 and T2 so as to cause the grids to be shifted laterally as need be in order that the tangs will extend equal distances from the sides of the conveyor pads. As the grids G1 and G2 pass toward the left of the free ends of the locating bars 160 and 161 they are engaged by laminated leaf spring members 162 and 163 which press the grids firmly down upon the pads (see Fig. 14). The springs 162 and 163 are supported by brackets 164 and 165 respectively attached to a cross frame 166 having legs 167 and 168 terminating in feet 169 and 170 respectively fastened to the side frames 30. The springs 163 and 164 terminate at 163x and 164x respectively. As the portions of the grids G1 and G2 leave the springs 162 and 163 respectively they are engaged by laminated leaf spring members 172 and 173 respectively attached to brackets 174 and 175 respectively connected with the cross bar 166 and connected by a cross bar 176.

Figures 13, 14, 15, 16:
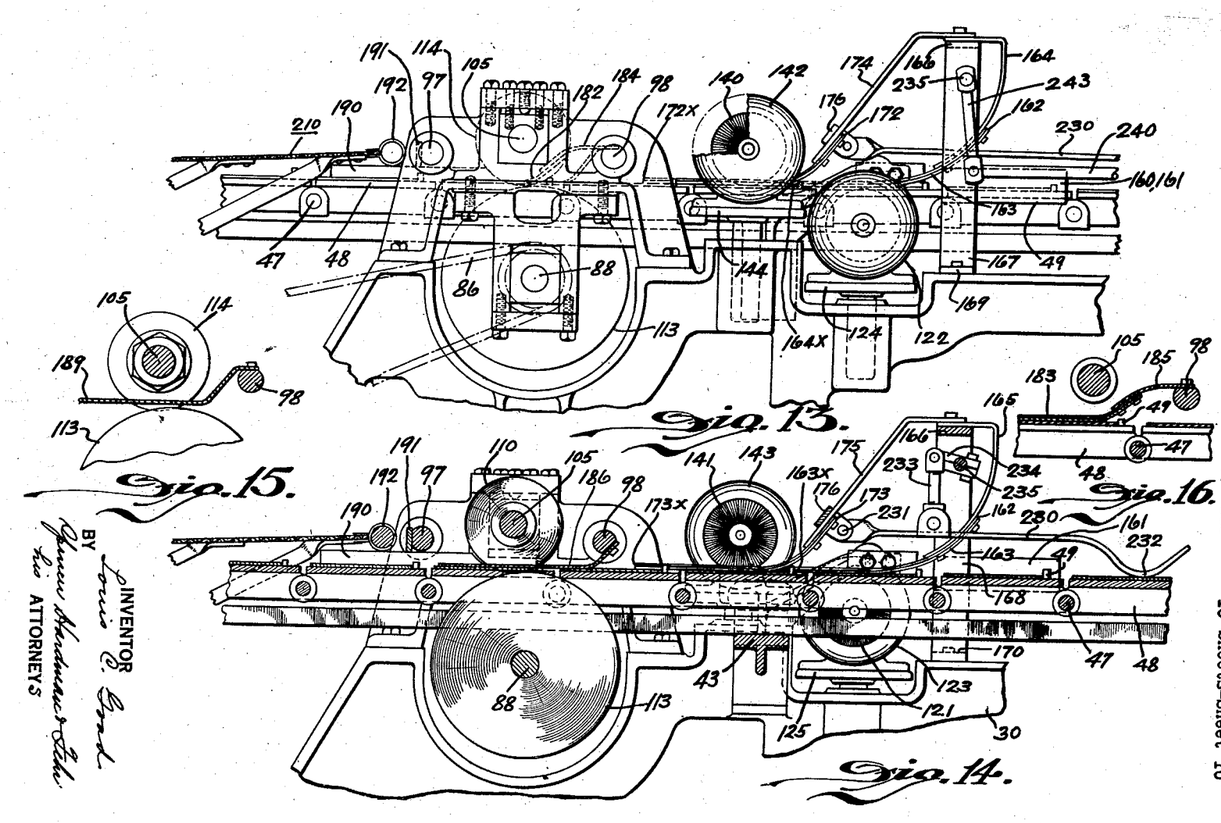
Fig. 13 is a fragmentary side elevation including some parts which are not shown in Figs. 3 and 4.
Fig. 14 is a fragmentary sectional view on the line 14—14 of Figs. 5 and 6.
Figs. 15 and 16 are fragmentary sectional views on the lines 15—15 and 16—16 of Fig. 5.

As portions of the grids G1 and G2 pass the free ends 172x and 173x of the springs 172 and 173 they are next engaged by laminated spring members 182 and 183 respectively carried by brackets 184 and 185 respectively attached to cross bar 98. The grids are also held down by a bifurcated laminated spring member 186 secured to the tie rod 98. While the tangs T1 and T2 are being trimmed off by the pairs of cutting wheels 113, 114 they are engaged respectively by bars 188 and 189 attached to the tie rod 98 as shown in Figs. 5 and 15.

As the grids pass from the cutting wheels on the shaft 105 toward the left as viewed in Fig. 5 they are shoved laterally a little further apart by a laminated bar 190 attached to a bracket 191 mounted on a rod 192 having its ends secured to brackets 193 and 194 respectively attached to the side frames 30 respectively. The two plates which form the bar 190 have their ends 190a and 190b spread apart so as to produce lateral movement of the grids upon the conveyor pads as they move toward the left in Fig. 5. When the grids are about vertically above the shaft 54 as shown in Figs. 3 and 5, the end 195 of a spreader 196 is received by the space between the spaced grids to maintain these grids in separated relation as they fall from the conveyor pads upon guides 197 and 198 which guide the grids G1 and G2 respectively flatwise upon the conveyor belt 71. As the grids descend upon the guides or chutes 197 and 198 they are spread apart by the spread ends 196a of the two plates which comprise the spreader 196. The spreader 196 is fastened to a cross bar 199 supported by the frames 30 and also support the guides or chutes 197, 198.

As the grids G1 and G2 leave the conveyor belt 71 they descend upon chutes 200 and 201 respectively which direct the grids into hoppers 202 and 203 respectively having hand recesses 204 and 205 respectively to facilitate picking up stacks of grids such as the stack of grids G1 shown in Fig. 3. The hoppers 202 and 203 are separated by a partition 206 which extends adjacent the belt 71 as indicated at 207.

Figure 2:
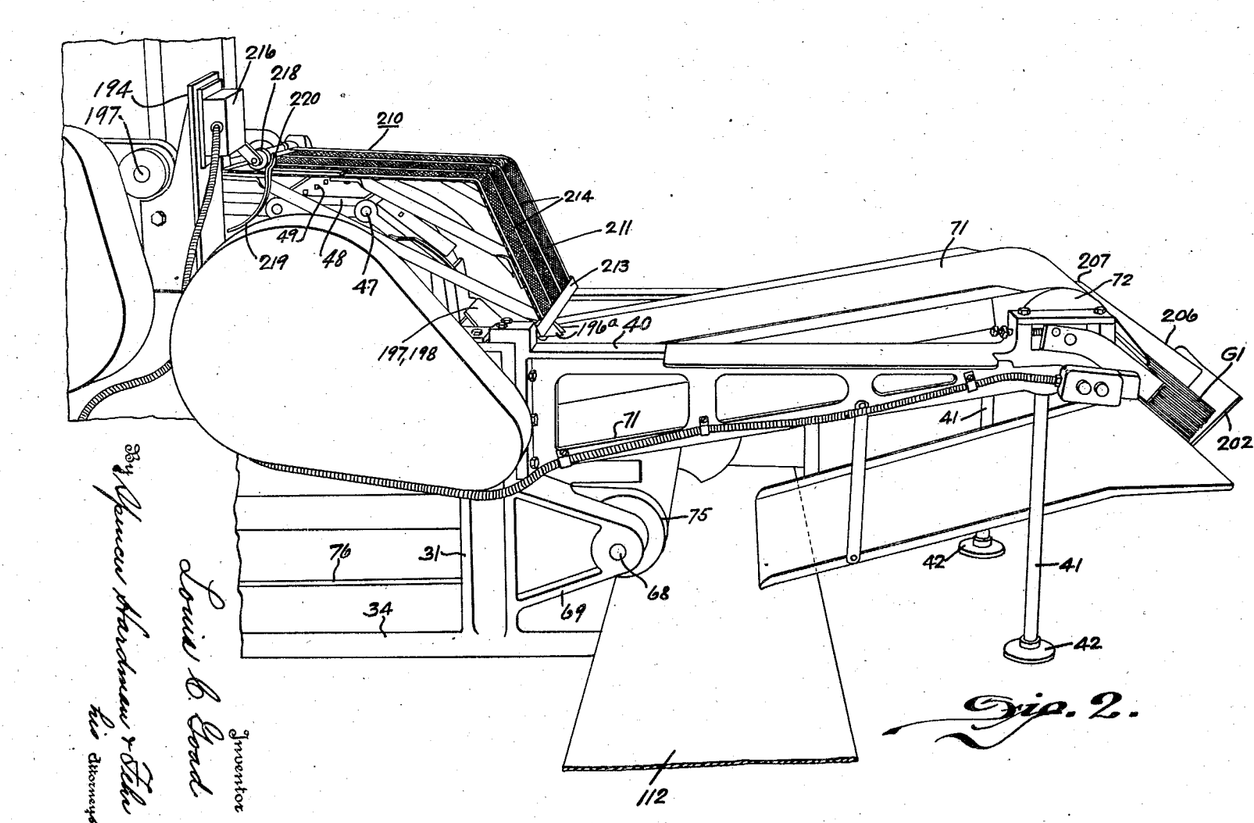

The machine has a number of devices which automatically stop the machine. One of these devices is associated with a guard 210 which comprises a plurality of strips of coarse wire mesh material 211 supported by side frames 212 and end frames 213 and intermediate frames 214. This frame is journalled at 215 upon the rod 192. The bracket 194 supports the rod 192 which supports an electric switch enclosed in a case 216 and operated by a lever 217 carrying a roller 218 which cooperates with a cam 219 carried by the guard 210. As shown in Fig. 2 the cam 219 has a portion 220 radially offset from the main portion of the cam which is concentric with the rod 192. When the guard 210 is down as shown in Fig. 2, the portion 220 receives the roller 218 permitting the roller to occupy such a position that the switch in the case 216 will not be operated to stop the motor. However, when the guard 210 is raised the cam 219 will effect such movement of the roller 218 as to open the switch within the case 216. It will be understood that this switch is one which controls the circuit to a relay electromagnet which controls a larger switch in the main circuit of the motor which drives the machine. As long as the switch within the case 216 remains closed it is possible to complete the circuit to the electromagnet of the main switch in order that the main switch may be closed thereby. When the switch within the case 216 is open the circuit to the electromagnet will be interrupted thereby permitting a spring or gravity to open the main switch of the motor. As the circuits of the auxiliary switch and main switch are well known to those skilled in the art of designing machinery operated by direct connected electric motors it is not deemed necessary to illustrate the wiring connections.

The machine provides means for automatically stopping the machine when there are no more grids to be conveyed by the conveyor. Referring to Figs. 6 and 14, it will be noted that a lever 230 which is pivoted at 231 upon the cross bar 176 has a free end portion 232 adapted to rest upon the pairs of grids as they move along upon the conveyor. The bar 230 is connected by link 233 with a lever 234 attached to a rod 235 supported by the legs 167 and 168 of the cross bar 166. The rod 235 carries lever 236 (see Fig. 1) which is adapted to operate a switch within a case 237 which when opened will open the circuit of the electromagnet of the main switch of the motor. The switch in the case 237 is also controlled by a lever 238 located adjacent the switch. This switch has also a remote control provided by a rod 240 having a handle 241 located adjacent the right end of the machine as viewed in Fig. 4. The handle 240 is guided by a bracket 242 and is attached to lever 243 also attached to the shaft 235. When a grid casting rests upon the pair of conveyor pads located under the free end portion 232 of the lever 230 the lever 230 will be raised into such position that the switch within the case 237 will not be operated to stop the main driving motor of the machine. However, when no grids are located upon the conveyor pads underneath the free end portion 232 of the lever 230, the lever will be permitted to drop down until it touches the upper surface of the pads. Such movement of the lever will effect a movement of the shaft 235 for causing the switch within the case 237 to be operated in a manner for causing the driving motor of the machine to be stopped.

The grid castings are fed automatically to the conveyor pads from a magazine 250 comprising parallel side walls 251 and an inclined bottom wall 252 having bosses 253 providing rails upon which the stack of grid castings C slide until the lowermost grid of the stack is obstructed from moving further due to the fact that its lower edge strikes pins 254 and its tangs T1, T2 respectively engage shoulders 255 provided respectively by bars 256 attached to the side wall members 251 of the magazine.

Referring to Figs. 4 and 17, the shaft 51 drives a hub member 260 to which a disc 261 is adjustably secured by screws 262 each passing through an arcuate slot 263 concentric with the axis of shaft 51. The disc 262 carries a plurality of pins 264 arranged in a circular row and each adapted to cooperate with a lever 265 carried by a shaft 266 mounted in bearing brackets 267 attached to the bottom wall 252 of the magazine 250. The shaft 266 operates levers 268 each connected by pins 269 and 270 with lifter bars 271 and 272 guided in channels provided in a bar 256. When the bars 271 move upwardly they engage the underside edges of the grid tangs and lift the bottom-most grid casting C from the position C1 shown in Fig. 22 to a position C2 shown in Fig. 23. In this position of the grid it is free of the pins 254 and of the shoulders 255; therefore, it will move downwardly with its tangs sliding over the top surfaces of the bars 256 as indicated at C3 in Fig. 23 and finally will come to position with its lower edge engaging the pins 280 fastened to the bottom wall 252 of the magazine 250. The lower edge of the grid casting in this position is indicated at 280a in Fig. 22. At the same time the grid tangs are stopped by shoulders 281 provided by bars 282 having notches 283 and attached to the bars 256 together with brackets 284. During the upward movement of the lifter bar 272 the grid is lifted from the position C4 in Fig. 22 to the position C5 in Fig. 23 in which position its lower edge clears the pins 254 and its tangs clear the shoulder 281 whereupon the casting will move into the position C6 in Fig. 23 with its tangs resting in the notches 283 of the bar 282. As the casting moves into the position C6 shown in Fig. 23 the casting swings toward the pads of the conveyor and its lower edge is caught by the conveyor pad pins 49 which on moving from the full line position to the broken line position 49a in Fig. 3 cause the casting to move into the position C7 with its tangs resting upon the brackets 284. As the conveyor rotates in a counterclockwise direction as viewed in Figs. 4 and 23 the casting C is caused to move in the same direction and its grids gradually to approach the pad 48. As the pad approaches the original upper portion above the shaft 51 the tangs are above the bracket 284 and the casting then moves into the machine while resting upon the pads 48.

Figures 22, 23:
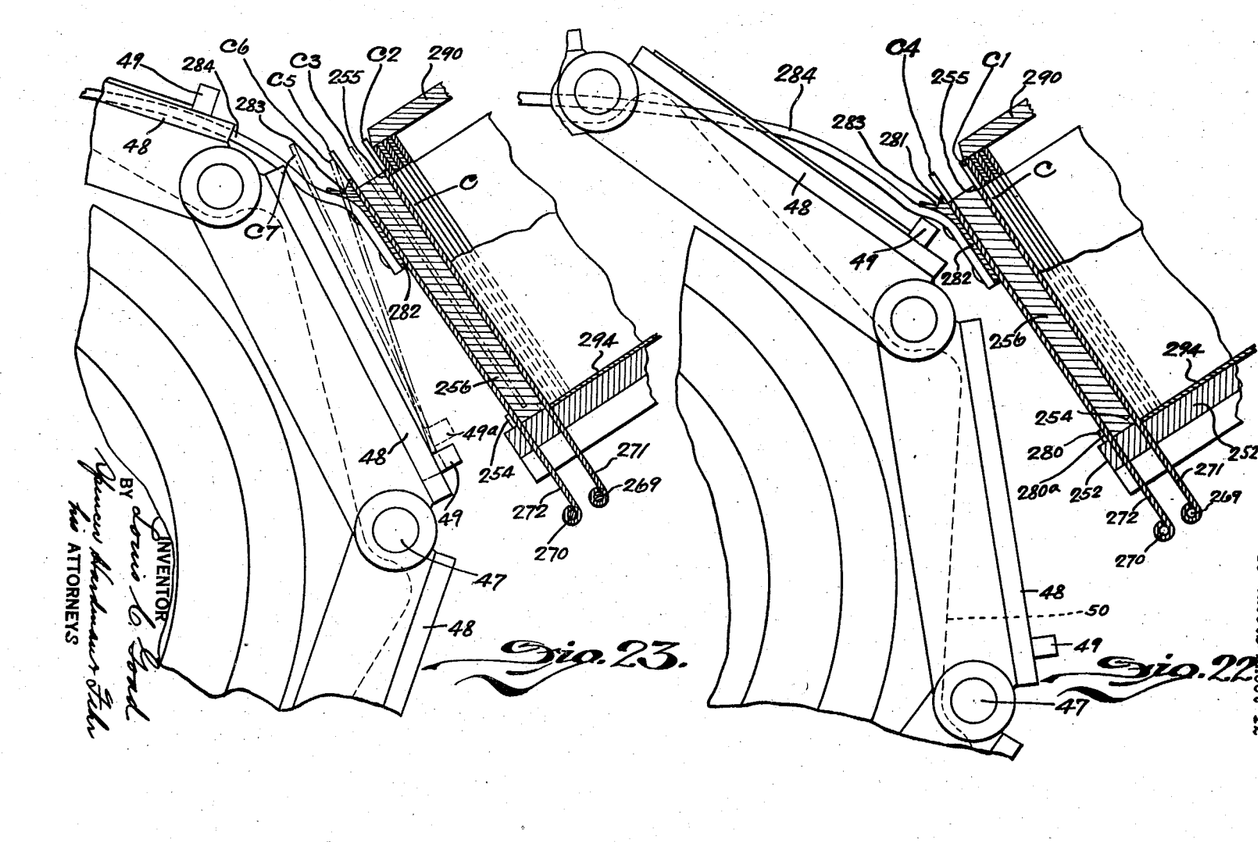
Figs. 22 and 23 are diagrams on an enlarged scale partly in section similar to Fig. 21 and show stages of operation of the magazine feed.

When the lowermost casting of the stack of grids C is moved upwardly by the pusher bars 271 the other castings can not move upwardly since their tangs are engaged by bars 290 attached to brackets 291 secured to the side walls of the magazine 250. It will be noted in Figs. 21 and 22 that the lower edges of the bars 290 clear the top edges of the tangs of the lowermost casting C. There are as many equidistant pins 264 as there are teeth on the sprocket wheels 50 and these pins are so located as to produce through the levers 265 and 268 and connecting shaft 266 upward movements of the pusher bars 271 and 272 each time that a pair of conveyor pads 48 are located so as to receive a grid from the apparatus which feeds the grids from the magazine. In order to agitate the stack of grids C so that they will gravitate toward the lower end of the magazine the shaft 266 carries a cam 293 operating on a bar 294 of flexible metal fixed at 295. For each oscillation of the shaft 266 there will be an oscillation of the bar 294 which by raising the stack of grid castings and permitting them to descend again into contact with the bottom wall of the magazine tends to keep them loose so that they will gravitate freely toward the lower end of the magazine. In this way the location of the lowermost grid casting of the stack in the position C1 of Fig. 22 is assured.

Figure 24:
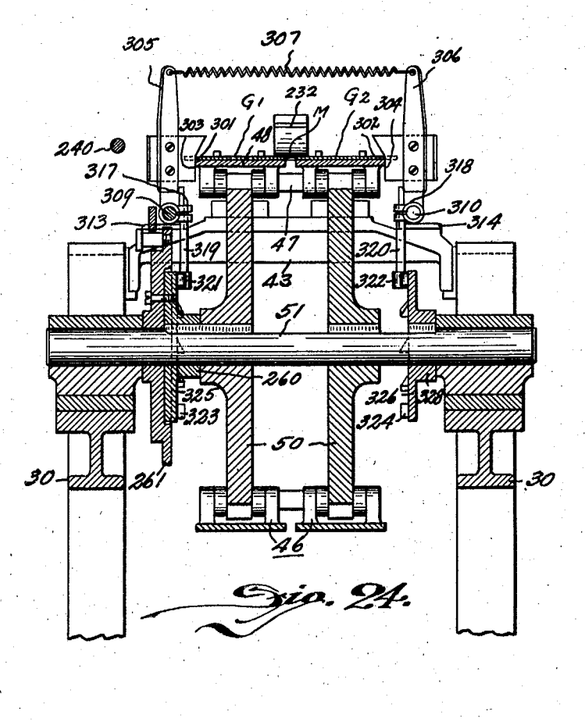
Fig. 24 is a sectional view on line 24—24 of Fig. 4.

Referring to Fig. 24 the side edges 301 and 302 of the grids G1 and G2 respectively are engaged by scrapers 303 and 304 respectively for the purpose of removing any surplus paste which, after the pasting and drying operations, may have adhered to these side edges. The plates 303 and 304 are carried by arms 305 and 306 respectively tied together by a coil spring 307 which operates to urge the blades toward the edges of the grids. The arms 305 and 306 are carried respectively by shafts 309 and 310 journalled respectively in pairs of bearings 311 and 312 supported respectively by angle iron brackets 313 and 314, said brackets being supported by the cross tie member 43. The ends of the shafts 309 and 310, adjacent the conveyor sprocket wheel shaft 51 are attached respectively to clamping hubs 317 and 318 which are clamped about the shafts by screw bolts or levers 319 and 320 respectively having elongated shanks carrying at their lower ends rollers 321 and 322 respectively. These rollers 321 and 322 are engaged respectively by circular rows of lugs 323 and 324 respectively carried respectively by plates 325 and 326, the former being integral with the hub member 260 to which the disc 261 is attached. The plate 326 has a hub 328 keyed to the shaft 51. The rows of lugs 323 and 324 are so located with respect to the shaft 51 and hence to the chain conveyors 46 that, as the grid tangs T1 and T2 move into close proximity to the scrapers 303 and 304 respectively, a lug 323 will engage the roller 321 and a lug 324 will engage a roller 322 thereby causing screw bolts or levers 319 and 320 to move counterclockwise and clockwise respectively, as viewed in Fig. 24, thereby causing the scrapers 303 and 304 to recede from the grid edges 301 and 302 respectively in order to permit the tangs T1 and T2 to pass these scrapers without being engaged thereby. As soon as the grid tangs pass the scrapers they are permitted to engage the side edges of the grids G1 and G2. In this way excess paste adhering to the side edges 301 and 302 of the grids is removed. Thus this machine saves the operation of subsequently scraping off the excess paste before the grid is assembled in a storage battery cell. The paste scraped off descends to the conveyor belt 76 and is finally collected in a suitable receptacle with the membrane parts M which are subjected to a process to recover the lead content thereof.

While the form of embodiment of the present invention as herein disclosed, constitutes a preferred form, it is to be understood that other forms might be adopted, all coming within the scope of the claims which follow.

What is claimed is as follows:

1. A machine for splitting grids cast in pairs and joined by a metal web of a certain width, which comprises in combination, spaced supports for supporting the grids of a pair with the metal web bridging the supports, a single rotating disc for progressively punching out the metal web lying between the supports upon relative movement between the disc and the spaced supports with the grids of a pair thereon, and means for causing relative movement between the spaced supports and the disc.

2. A machine for splitting grids cast in pairs and joined by a metal web of a certain width, which comprises, in combination, spaced supports for supporting the grids of a pair with the metal web bridging the supports, a single rotating disc for progressively punching out the metal web between the supports upon movement of the spaced supports with the grids of a pair thereon relative to the disc, means for moving the spaced supports relative to the disc, and yielding means for depressing the grids of a pair upon the supports while passing the disc.

3. A machine for splitting grids cast in pairs and joined by a metal web of a certain width, which comprises, in combination, a conveyor having a plurality of pairs of spaced supporting pads for supporting the grids of a pair with the metal web bridging the pads, and a single rotating disc for progressively punching out the metal web between the pads which themselves serve as lower die members as the conveyor moves the pads and pair of grids supported thereby past said disc.

4. A machine for splitting grids cast in pairs and joined by a metal web of a certain width, which comprises, in combination, an endless belt conveyor having grid supporting pads arranged in two spaced rows extending longitudinally thereof and arranged in pairs for supporting the grids of a pair with the metal web bridging the pads and extending in the direction of movement of the conveyor, and a single rotating disc located between the rows of pads for progressively punching out the metal web between the rows of pads, said pads themselves serving as lower die members for said rotating disc, whereby the operation may be continuous.

5. In an apparatus for operating upon storage battery grid castings, the combination of a conveyor for the grid castings; a magazine in which grid castings are stored in stacked fashion, the lowermost grid casting therein being out of engagement with the conveyor; and means actuated in response to movement of the conveyor for causing the lowermost grid casting in the magazine to descend by gravity toward the conveyor.

6. In an apparatus for operating upon storage battery grid castings, the combination of a conveyor for the grid castings; a magazine in which grid castings are stored in stacked fashion, the lowermost grid casting therein being out of engagement with the conveyor; means actuated in response to movement of the conveyor for bodily separating the lowermost grid casting in the magazine from the remaining grid castings therein; and means also actuated in response to movement of the conveyor for transferring the bodily separated grid casting upon the conveyor.

7. In an apparatus for operating upon storage battery grid castings having laterally extending tangs adjacent one edge thereof, the combination of a conveyor for the castings; a magazine in which grid castings are stored in stacked fashion; means actuated in response to movement of the conveyor for causing bodily separation between the lowermost grid casting in the magazine and the remaining grid castings therein; bars carried by the magazine and providing notches adapted to receive the tangs of the bodily separated grid casting; means actuated in response to movement of the conveyor for moving the bodily separated grid casting so that the tangs thereof locate in said notches whereby the edge of said grid casting which is remote from the tangs descends by gravity upon the conveyor; and pins on the conveyor adapted during movement of the latter to engage that edge of the grid casting which rests on the conveyor whereby the grid casting is moved in such manner that the tangs thereof move out of the notches and the grid casting descends by gravity toward the conveyor.

8. In an apparatus for operating upon storage battery grid castings having laterally extending tangs adjacent one edge thereof, the combination of a conveyor for the castings; a magazine in which grid castings are stored in stacked fashion; means actuated in response to movement of the conveyor for causing bodily separation between the lowermost grid casting in the magazine and the remaining grid castings therein; bars carried by the magazine and providing notches adapted to receive the tangs of the bodily separated grid casting; means actuated in response to movement of the conveyor for moving the bodily separated grid casting so that the tangs thereof locate in said notches whereby the edge of said grid casting which is remote from the tangs descends by gravity upon the conveyor; brackets carried by the magazine and adapted slidably to support the tangs whereby the grid casting is gradually lowered upon the conveyor upon movement of the grid casting in unison with the conveyor; and pins on the conveyor adapted during movement of the latter to engage that edge of the grid casting which rests on the conveyor and to move the grid casting in unison with the conveyor whereby the tangs move out of the notches and the grid casting descends by gravity until the tangs thereof rest on said bracket.

9. In an apparatus for operating upon storage battery grid castings having laterally extending tangs adjacent one edge thereof, the combination of a conveyor for the castings; a magazine in which grid castings are stored in stacked fashion; means actuated in response to movement of the conveyor for causing bodily separation between the lowermost grid casting in the magazine and the remaining grid castings therein; bars carried by the magazine and providing notches adapted to receive the tangs of the bodily separated grid casting; means actuated in response to movement of the conveyor for moving the bodily separated grid casting so that the tangs thereof locate in said notches whereby the edge of said grid casting which is remote from the tangs descends by gravity upon the conveyor, brackets carried by the magazine adapted slidably to support the tangs whereby the grid casting is gradually lowered upon the conveyor and guided into proper position thereupon upon movement of the grid casting in unison with the conveyor; and pins on the conveyor adapted during movement of the latter to engage that edge of the grid casting which rests on the conveyor and to move the grid casting in unison with the conveyor whereby the tangs move out of the notches and the grid casting descends by gravity until the tangs thereof rest on said bracket.

10. In an apparatus for operating upon storage battery grid castings having laterally extending tangs adjacent one edge thereof, the combination of a conveyor for the castings; a magazine in which grid castings are stored in stacked fashion; pins in the bottom wall of the magazine for supporting the lower edge portion which is parallel to the first mentioned edge of the lowermost grid casting in the magazine; bars attached to the magazine each providing a shoulder sufficient to support the tangs of the lowermost grid casting in the magazine; a bar for maintaining the stacked grid castings in the magazine except the lowermost in close proximity to the bottom wall so that said grid castings cannot clear said pins; bars attached to the magazine each providing a shoulder and a notch adapted progressively to receive a tang of the lowermost grid casting in the magazine; means actuated in response to movement of the conveyor for moving the tangs of said lowermost grid casting over the first mentioned shoulders whereby the mentioned lower edge portion of the grid casting clears the pins whereupon the grid casting is free to descend by gravity until the tangs engage the shoulders of the last mentioned bars; another longer pin in the bottom wall of the magazine adapted to be engaged by the mentioned lower edge portion of the descending grid casting; means also actuated in response to movement of the conveyor for moving a descended grid casting so that the tangs thereof move over the supporting shoulders of the last said bars into the notches thereof whereby the mentioned lower edge portion of the grid casting clears said other pin and descends upon the conveyor; brackets carried by the magazine and adapted slidably to support the tangs whereby the grid casting is gradually lowered upon the conveyor upon movement of said grid casting in unison with the conveyor; and pins on the conveyor adapted during movement of the latter to engage that edge of the grid casting which rests on the conveyor and to move the grid casting in unison with the conveyor whereby the tangs move out of the notches and the grid casting descends by gravity until the tangs thereof rest on said brackets.

11. In an apparatus for operating upon storage battery grid castings having laterally extending tangs adjacent one edge thereof, the combination of a conveyor for the castings; a magazine in which grid castings are stored in stacked fashion, pins in the bottom wall of the magazine for supporting the lower edge portion which is parallel to the first mentioned edge of the lowermost grid casting in the magazine; bars attached to the magazine each providing a shoulder sufficient to support the tangs of the lowermost grid casting in the magazine; a bar for maintaining the stacked grid castings in the magazine except the lowermost in close proximity to the bottom wall so that said grid castings cannot clear said pins, bars attached to the magazine each providing a shoulder and a notch adapted progressively to receive a tang of the lowermost grid casting in the magazine; pusher bars guided for movement by the first mentioned bars; means for reciprocating the pusher bars once during movement of the conveyor through a predetermined cycle, said pusher bars moving the tangs of said lowermost grid casting over the first mentioned shoulders during movement in one direction, whereby the mentioned lower edge portion of the grid casting clears the pins whereupon the grid casting is free to descend by gravity until the tangs engage the shoulders of the last mentioned bars; another longer pin in the bottom wall of the magazine adapted to be engaged by the mentioned lower edge portion of the descending grid casting; other pusher bars guided for movement by the first mentioned bars and moving in unison with the first mentioned pusher bars, said other pusher bars being adapted during movement in the other direction to move a descended grid casting so that the tangs thereof move over the supporting shoulders of the last said bars into the notches thereof whereby the mentioned lower edge portion of the grid casting clears said other pin and descends upon the conveyor; brackets carried by the magazine and adapted slidably to support the tangs whereby the grid casting is gradually lowered upon the conveyor upon movement of said grid casting in unison with the conveyor; and pins on the conveyor adapted during movement of the latter to engage that edge of the grid casting which rests on the conveyor and to move the grid casting in unison with the conveyor whereby the tangs move out of the notches and the grid casting descends by gravity until the tangs thereof rest on said brackets.

12. In an apparatus for operating upon storage battery grid castings having laterally extending tangs adjacent one edge thereof, the combination of a conveyor for the castings; a magazine in which grid castings are stored in stacked fashion, pins in the bottom wall of the magazine for supporting the lower edge portion which is parallel to the first mentioned edge of the lowermost grid casting in the magazine; bars attached to the magazine each providing a shoulder sufficient to support the tangs of the lowermost grid casting in the magazine; a bar for maintaining the stacked grid castings in the magazine except the lowermost in close proximity to the bottom wall so that said grid castings cannot clear said pins, bars attached to the magazine each providing a shoulder and a notch adapted progressively to receive a tang of the lowermost grid casting in the magazine; pusher bars guided for movement by the first mentioned bars; means actuated in response to movement of the conveyor through a predetermined cycle for reciprocating the pusher bars once, said pusher bars moving the tangs of said lowermost grid casting over the first mentioned shoulders during movement in one direction, whereby the mentioned lower edge portion of the grid casting clears the pin whereupon the grid casting is free to descend by gravity until the tangs engage the shoulders of the last mentioned bars; another longer pin in the bottom wall of the magazine adapted to be engaged by the mentioned lower edge portion of the descending grid casting; other pusher bars guided for movement by the first mentioned bars and moving in unison with the first mentioned pusher bars, said other pusher bars being adapted during movement in the other direction to move a descended grid casting so that the tangs thereof move over the supporting shoulders of the last said bars into the notches thereof whereby the mentioned lower edge portion of the grid casting clears said other pin and descends upon the conveyor; brackets carried by the magazine and adapted slidably to support the tangs whereby the grid casting is gradually lowered upon the conveyor upon movement of said grid casting in unison with the conveyor; and pins on the conveyor adapted during movement of the latter to engage that edge of the grid casting which rests on the conveyor and to move the grid casting in unison with the conveyor whereby the tangs move out of the notches and the grid casting descends by gravity until the tangs thereof rest on said bracket.

13. In an apparatus for operating upon storage battery grid castings, the combination of a conveyor for the castings; an inclined magazine in which grid castings are stored in stacked fashion; means actuated in response to movement of the conveyor for causing the lowermost grid casting in the magazine to descend by gravity toward the conveyor; and means actuated in response to operation of the last said means for engaging the lower edges of the grid castings in the magazine in order to agitate them whereby to assure the descent of the remaining grid castings in the magazine by gravity.

14. In an apparatus for operating upon storage battery grid castings, the combination of a conveyor for the castings; an inclined magazine in which grid castings are stored in stacked fashion, part of the grid supporting wall of the magazine being of flexible metal; means actuated in response to movement of the conveyor for causing the lowermost grid casting in the magazine to descend by gravity toward the conveyor; and a cam actuated in response to operation of the last said means for slightly flexing the flexible part of the grid supporting wall of the magazine whereby the grid castings in the magazine are agitated and caused to descend by gravity into the space vacated by the descended grid casting.

15. A machine for splitting grids cast in pairs and joined by a web comprising, in combination, a continuously moving endless conveyor having a plurality of pairs of spaced pads for supporting the grids of a pair with the web bridging the pads and extending in the direction of movement of the conveyor; a device located between the rows of pads for progressively punching the web down between the rows of pads as the grids of a pair pass said device; a continuously moving endless belt conveyor; a pair of hoppers into which the separated grids of a pair are adapted to descend by gravity from the belt conveyor; and stationary means between both conveyors for properly guiding the separated grids of a pair upon the belt conveyor when descending by gravity from the other conveyor so that the grids will be in alignment with the hoppers while moving with the belt conveyor.

16. A machine for splitting grids cast in pairs and joined by a web comprising, in combination, a continuously moving endless conveyor having a plurality of pairs of spaced pads for supporting the grids of a pair with the web bridging the pads and extending in the direction of movement of the conveyor; a device located between the rows of pads for progressively punching the web down between the rows of pads as the grids of a pair pass said device; a continuously moving endless belt conveyor; a pair of hoppers into which the separated grids of a pair are adapted to descend by gravity from the belt conveyor; stationary means between both conveyors for guiding the separated grids of a pair flatwise upon the belt conveyor when descending by gravity from the other conveyor; and stationary means for further spreading the separated grids of a pair apart while descending upon the belt conveyor, so that the grids will be in proper alignment with the hoppers while moving with the belt conveyor.

17. A machine for splitting grids cast in pairs and joined by a web comprising, in combination, a continuously moving endless conveyor having a plurality of pairs of spaced pads for supporting the grids of a pair with the web extending in the direction of movement of the conveyor; each of said pads having means for preventing movement of the grids in the counter-direction of movement of the conveyor pads relative thereto; a device located between the rows of pads for progressively punching the web down between the rows of pads as the grids of a pair pass said device; stationary means for shifting the grids of a pair on moving conveyor pads laterally of the direction of movement of the conveyor so that the joining web is in proper alignment with said device; a continuously moving endless belt conveyor; a pair of hoppers into which the separated grids of a pair are adapted to descend by gravity from the belt conveyor; and stationary means between both conveyors for properly guiding the separated grids of a pair upon the belt conveyor when descending by gravity from the other conveyor so that the grids will be in alignment with the hoppers while moving with the belt conveyor.

18. Apparatus for operating upon storage battery grid castings having outwardly projecting tangs thereon, comprising, in combination, a grid casting conveyor, having pads for supporting said grid castings with their side edges and outwardly projecting tangs extending beyond the pads, means for scraping against the outer side edges of the castings as they are moved along by the conveyor, and automatic means for intermittently laterally retracting the scraping means to permit the tangs to pass free of engagement with the scraping means.

19. Apparatus for operating upon storage battery grid castings having outwardly projecting tangs thereon comprising, in combination, a grid casting conveyor having pads for supporting said grid castings with their side edges and outwardly projecting tangs beyond the pads; means for scraping against the outer side edges of the castings as they are moved along by the conveyor; and means actuated in response to movement of the conveyor for intermittently laterally retracting the scraping means to permit the tangs to pass free of engagement with the scraping means.

20. A machine for splitting grids cast in pairs which are joined by a web and have outwardly projecting tangs on the side edges thereof comprising, in combination, a grid casting conveyor having pads for supporting said grid castings with their side edges and outwardly projecting tangs beyond the pads; a rotating shaft; a single disc on said shaft for progressively punching out the web between the pads as the conveyor moves the pads and pair of grids supported thereby past said disc; a pair of discs also mounted on said shaft; another pair of rotating discs cooperating with the first mentioned pair of discs for trimming the tangs as the conveyor moves the pads and pair of grids supported thereby past said discs; and yielding means for depressing the pair of grids upon the pads while the same move past all discs.

21. A machine for splitting grids cast in pairs which are joined by a web and have outwardly projecting tangs on the side edges thereof comprising, in combination, a movable conveyor having a plurality of pairs of spaced pads for supporting the grids of a pair with the web extending in the direction of movement of the conveyor, each of said pads having means for preventing movement of the grids in the counter-direction of movement of the conveyor pads relative thereto; a rotating shaft; a single disc on said shaft for progressively punching out the web between the pads as the conveyor moves the pads and pair of grids supported thereby past said disc; a pair of discs also mounted on said shaft; another pair of rotating discs for trimming the tangs as the conveyor moves the pads and pair of grids supported thereby past said discs; stationary means for shifting the grids of each pair on moving conveyor pads laterally of the direction of movement of the conveyor so that the joining web is in proper alignment with said single disc; and yielding means engaging and depressing the pair of grids upon the pads while the same move past all discs whereby the grids of a pair are held in proper alignment with all discs.

LOUIS C. GOAD.